(No Model.)
S. T. BEALE, Jr.
ARTIFICIAL TOOTH.
No. 374,572. Patented Dec. 13, 1887.
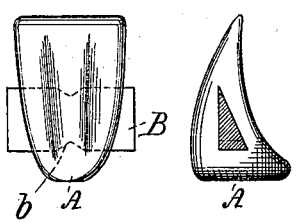
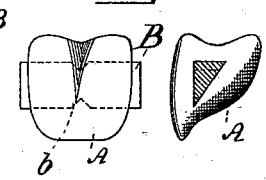
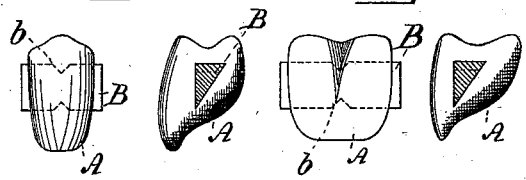
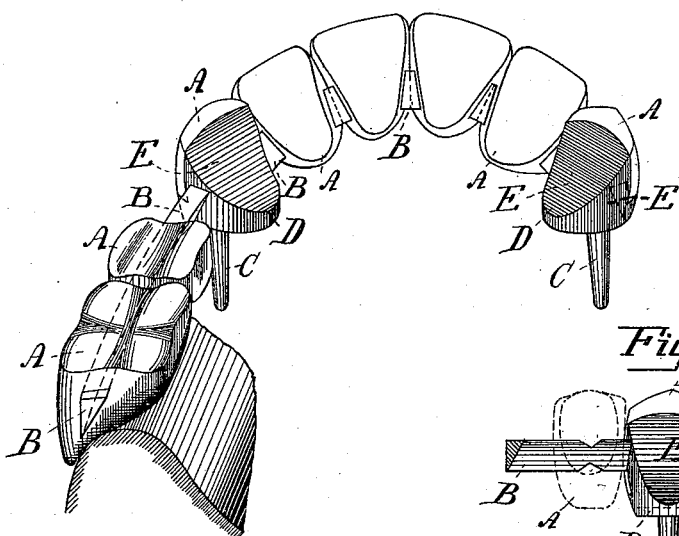
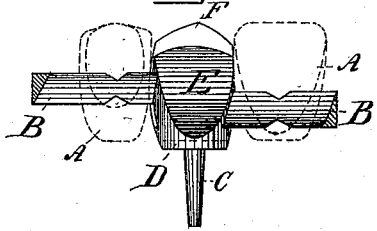
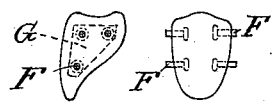
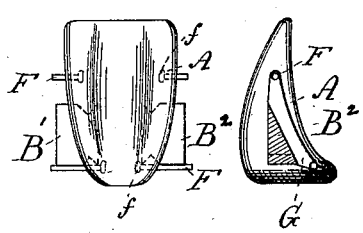
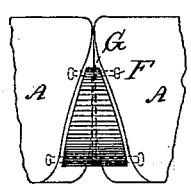
WITNESSES:
Hermann Bormann
Thomas M. Smith
INVENTOR.
Stephen T. Beale Jr.
by J. Walter Douglass
Atty.

UNITED STATES PATENT OFFICE.

STEPHEN T. BEALE, JR., OF PHILADELPHIA, PENNSYLVANIA.

ARTIFICIAL TOOTH.

SPECIFICATION forming part of Letters Patent No. 374,572, dated December 13, 1887.

Application filed February 24, 1887. Serial No. 228,643. (No model.)

*To all whom it may concern:*

Be it known that I, STEPHEN T. BEALE, Jr., of the city and county of Philadelphia, in the State of Pennsylvania, have invented certain new and useful Improvements in Artificial Teeth, of which the following is a specification.

My invention relates to certain improvements in the manufacture of artificial teeth, and in the manner of readily and economically attaching one tooth to another in what is designated in dental surgery as "bridge-work."

It has long been customary to use palates of hard rubber, gold, or other material, to which artificial teeth were suitably attached; but where the loss of one or more teeth has occurred in the mouth the use of such palates have been found exceedingly objectionable, and hence to avoid their use walls of platinum and gold have been built up by the dentist and artificial teeth soldered thereto, forming what is known in dental surgery as a "bridge" for spanning the teeth, and filling in the space in the mouth caused by the loss by decay or otherwise of such natural tooth or teeth. The wall so formed with porcelain teeth suitably attached to the same being then soldered at each extremity to porcelain teeth provided with metallic caps having sockets through which anchor-posts projected, and the posts fitted into the natural roots holding the teeth in position. This method of fitting artificial teeth in the mouth is quite expensive, owing to the quality and quantity of material which it has been found necessary to use in order to obtain the required strength, and, moreover, it is expensive as to time and labor involved for satisfactorily perfecting the work.

It is the principal object of my invention to materially lessen the cost and quantity of material used and time and labor involved in the preparation of bridge-work for the mouth, while at the same time retaining the relative amount of strength for the work of the artificial teeth in the mouth; and to which ends my invention consists in providing an artificial tooth, made of porcelain or other suitable material, of the shape or substantially the shape of a natural tooth, with a platinum or alloyed platinum or other strong metallic bar baked into the tooth in its formation and extending either entirely or only partially through the tooth, in conjunction with one or more teeth having metallic backs and anchor-posts capable of being arranged so that a series of teeth may be soldered or otherwise secured to one another, forming, when so united, a continuous row of teeth held solidly together and firmly in the mouth.

My invention further consists in providing a porcelain or artificial tooth with one or more pins baked, fastened, or otherwise secured in the body of a tooth in its formation and extending laterally therefrom in such manner that the metallic bar and pins of each tooth will always be in such position as to admit of the fitting of a metallic plate around the pins, so as to impinge against the metallic bar projecting from the tooth; and, furthermore, in order that the arch which the teeth are to form may be materially strengthened, so that when the teeth are placed in position solder may be freely admitted to the jointed bars between the teeth, and also onto the metallic plates, thereby entirely or nearly filling up the space between the rear sloping portions of the respective teeth, giving additional strength to the same for the performance of their particular functions in the mouth of the wearer.

My invention will be more fully understood by reference to the accompanying drawings, forming part hereof, wherein—

Figure 1 represents front and side elevations, respectively, of a front tooth, showing the platinum or metallic bar passing through the tooth. Fig. 2 represents a similar view of a bicuspid tooth with the metallic bar passing laterally through the tooth. Fig. 3 represents a similar view of a molar tooth with the invention shown in application. Fig. 4 is a perspective view of a series of teeth with the metallic bars passing through the several teeth and suitably united to one another, and also showing the manner of uniting the respective bars to the metallic caps of cuspid or other artificial teeth. Fig. 5 is a rear elevation of three teeth provided with the lateral triangular or V-shaped metallic bars suitably united thereto. Fig. 6 represents front and side elevations, respectively, of a front tooth, showing a triangular-shaped metallic bar and pins wedged into the body of the tooth from each side and a platinum or other metallic plate attached to the pins. Fig. 7 is a rear elevation, partly in broken section, showing the metallic pins secured in the respective teeth and projecting laterally therefrom, with a platinum plate fitted thereon and between the sloping sides of the two teeth. Fig. 8 represents front and side elevations, respectively, of a bicuspid tooth with the metallic pins projecting laterally from the body of the tooth on each side; and Fig. 9 is a similar view of a molar tooth with the triangular-shaped metallic bar suitably secured into the body of the tooth and projecting laterally from the respective sides thereof.

Referring to the drawings for a further description of my invention, A represents a tooth, which may be a front, cuspid, bicuspid or molar, made of porcelain or other suitable material.

B represents the metallic triangular-shaped bar, made of platinum, alloyed platinum, or other suitable metal, and baked into the body of the tooth in its formation and projecting laterally from the sides thereof. In order that this metallic bar may be rigidly held in place in the body of the tooth A, and to prevent it from moving therein, there are preferably provided V-shaped notches $b$ in each bar, into which the material of which the tooth is composed is embedded, thereby holding the bar firmly in position.

C is a metallic anchor-post, which projects downward from a socket-cap, D, of the cuspid tooth in Fig. 4, having a metallic back, E, and a porcelain face, A.

B' and B², Figs. 6 and 9, represent a modified form of the triangular-shaped metallic bar, which is shown suitably dovetailed or baked into the body of the tooth in its formation, and so arranged that the bar will project outward from each a short distance to permit of another metallic bar in an adjoining tooth being united thereto by means of solder or other suitable material.

F represents one or more pins baked or otherwise secured in the body of each tooth and projecting laterally therefrom. These pins are preferably provided with heads $f$, for holding them in place in the tooth A.

In Figs. 6 and 7, G represents a platinum or other metallic plate fitted over the pins F, and furnishing means whereby the filling up of the space between the two teeth, as shown in Fig. 7, may be accomplished, and, moreover, for adding strength to the arch or bridge thus formed.

When large artificial teeth are preferred in the mouth, the metallic bar B and two metallic pins, F, may be used, projecting laterally from the sides of the tooth, to which a metallic plate, G, is inserted and so arranged that they may be joined to another tooth provided with a similar metallic bar, pins, and a metallic plate, G, in order that the space between the two teeth may be almost entirely filled in flush with the rear portions of the respective teeth for making a strong bridge or arch between them. When medium-sized porcelain teeth in the mouth are preferred, the metallic bar B may alone be used with practical success in the accomplishment of the desired object in this class of dental bridge-work. When small porcelain teeth are used in the mouth, it will be found preferable to use but three pins, F, so arranged as to form a triangle, as shown in Fig. 8, and to secure to them a metallic plate, G, so that the pins and metallic plate G of an adjoining tooth may be readily united, thereby forming a strong arch or bridge between the teeth, as will be fully understood by those skilled in dental surgery without further description.

It will be observed that the metallic bars B pass through the respective teeth, and are united to one another by means of solder, as shown in Fig. 4, and also that the series of teeth are held firmly to the respective teeth A by the soldering of the bars B to the metallic backs E thereof, and the anchor-posts C inserted and fitted snugly in apertures prepared by the dentist in the roots to receive them, thereby holding the artificial teeth in position in the mouth, with an entire absence of the objectionable back walls of platinum and gold having teeth soldered thereto, and, moreover, with the weight of the artificial teeth by this arrangement of them in the mouth materially lessened to the wearer.

I do not wish to be understood as limiting myself to a triangular-shaped metallic bar passing laterally through a tooth, or fastened into the body of the tooth from each side, nor to any particular form of pins as hereinbefore described, but crave the right to modify the shape of the same in any manner that may be deemed best for better carrying out the invention without, however, departing from the real spirit thereof.

Having thus described the nature and objects of my invention, what I claim as new, and desire to secure by Letters Patent, is—

1. An artificial tooth having a triangular-shaped bar baked into the body thereof in its formation and extending beyond the side walls of said tooth, in combination with one or more teeth having metallic backs with sockets and anchor-posts, substantially as and for the purposes set forth.

2. An artificial tooth, in combination with a horizontal bar and one or more pins with heads which are held firmly in the body of the tooth, and the opposite ends of said bar and pins extending beyond the side walls of the tooth for attachment to a tooth having a similar bar and pins fitted into the same, substantially as described.

3. A porcelain tooth provided with a metallic bar projecting laterally from the sides thereof, in combination with teeth having metallic backs provided with sockets and posts, substantially as described.

4. The combination, with one or more artificial teeth, of one or more horizontal pins baked into the body of the teeth and extended laterally from the side walls thereof, and one or more metallic plates fitted onto said pins, all arranged substantially as and for the purposes set forth.

5. The combination, with a porcelain tooth and a triangular-shaped bar running horizontally through said tooth, of one or more pins, the heads of which are embedded into the body of the tooth in its formation and extended from the side walls thereof, and a platinum or other plate attached to said bar and pins, substantially as and for the purposes set forth.

In witness whereof I have hereunto set my hand in the presence of two subscribing witnesses.

S. T. BEALE, JR.

Witnesses:
A. P. BEALE,
THOS. M. SMITH.